United States Patent [19]

Erhardt et al.

[11] 4,287,659
[45] Sep. 8, 1981

[54] METHOD AND APPARATUS FOR EXCHANGING TOOLS IN HOBBING MACHINES

[75] Inventors: Manfred Erhardt, Puchheim; Werner Fendt, Munich; Manfred Huber, Germering, all of Fed. Rep. of Germany

[73] Assignee: Carl Hurth Maschinen- und Zahnradfabrik GmbH & Co., Munich, Fed. Rep. of Germany

[21] Appl. No.: 32,214

[22] Filed: Apr. 23, 1979

[30] Foreign Application Priority Data

Apr. 25, 1978 [DE] Fed. Rep. of Germany ....... 2818018

[51] Int. Cl.³ ............................................. B23Q 3/157
[52] U.S. Cl. .......................................... 29/568; 409/7;
409/11; 409/12; 414/728
[58] Field of Search ................ 29/568; 409/7, 11, 12, 409/63; 51/168; 414/728, 739, 786

[56] References Cited

U.S. PATENT DOCUMENTS

| | | | |
|---|---|---|---|
| 2,804,727 | 9/1957 | Schmidt | 51/168 X |
| 2,834,258 | 5/1958 | Anderson et al. | 409/7 |
| 2,865,258 | 12/1958 | Flair | 409/11 |
| 3,202,057 | 8/1945 | Bregi | 409/7 |
| 3,412,459 | 11/1968 | Hollis | 29/568 |

*Primary Examiner*—Z. R. Bilinsky
*Attorney, Agent, or Firm*—Blanchard, Flynn, Thiel, Boutell & Tanis

[57] ABSTRACT

A method and apparatus for effecting an automated exchange of a tool in hobbing machines. At least a pair of gripping devices are mounted on a shaft for relative sliding movement therealong and for selective locking engagement with the shaft so that a rotation of the shaft will effect a rotary movement of a selected one of the gripping devices. The rotary movement of the selected gripping device is between a storage position and a working position. The gripping device is capable of holding a tool which is to be exchanged for a worn out tool. The other gripping device is generally empty and is first moved into the working position to extract the worn out tool from the milling spindle. Thereafter, the gripping devices are shifted to bring the appropriate device having a new tool therein into a position so that it can be rotated with the shaft to bring the new tool into the working position and inserted onto the milling spindle.

14 Claims, 6 Drawing Figures

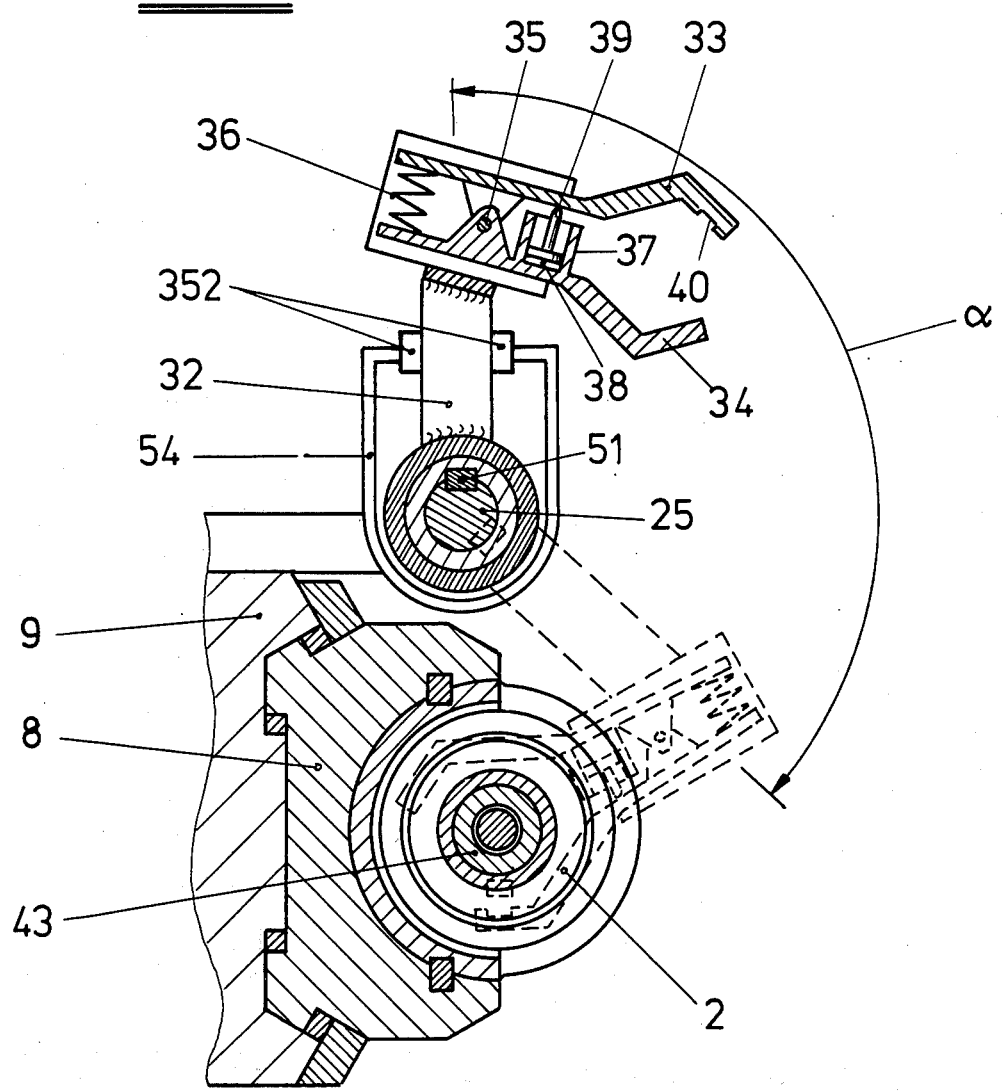

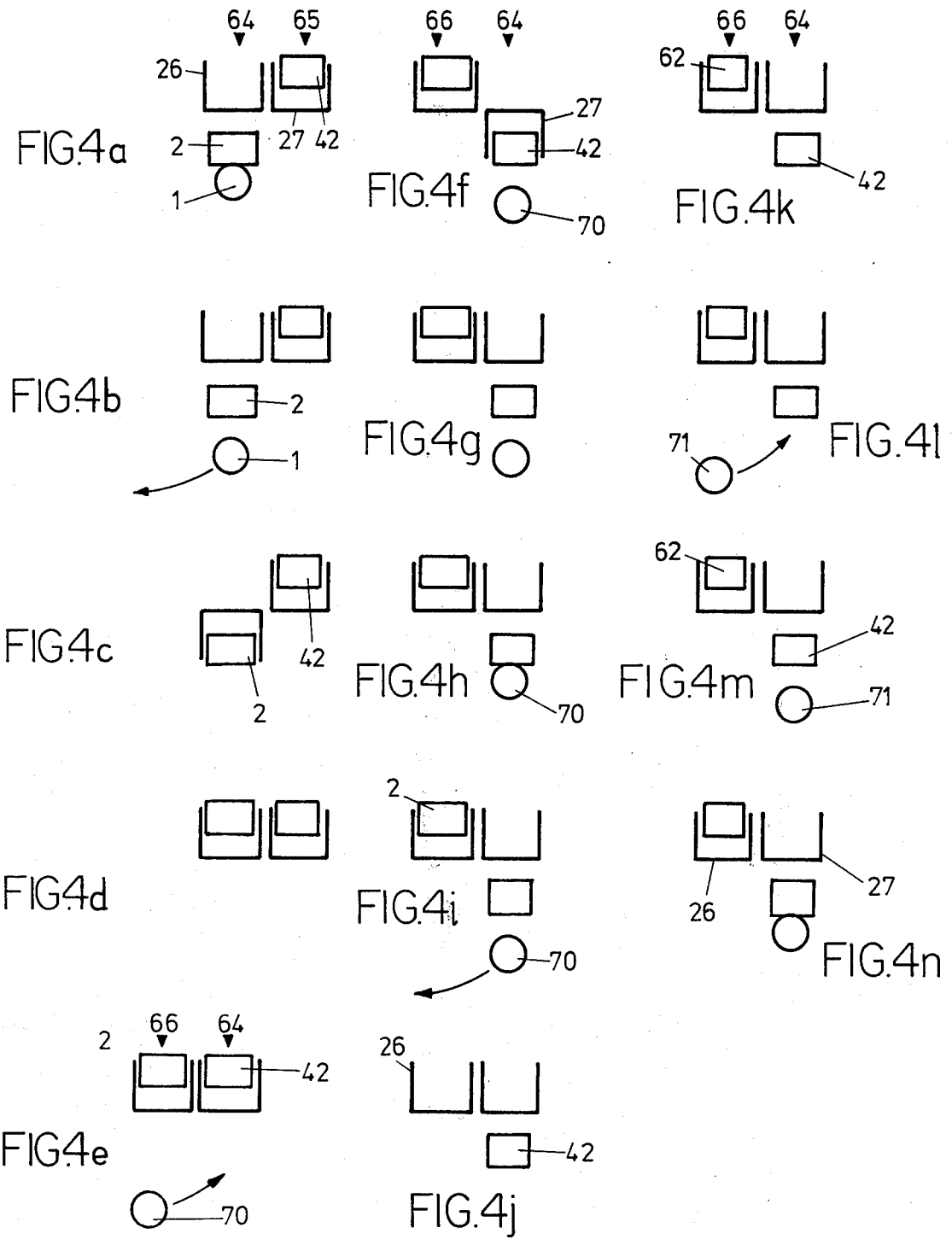

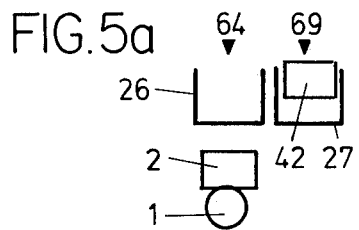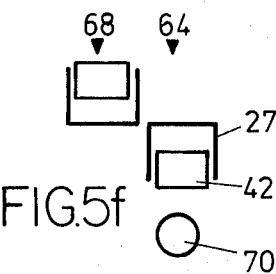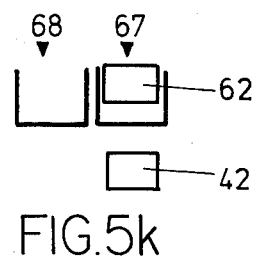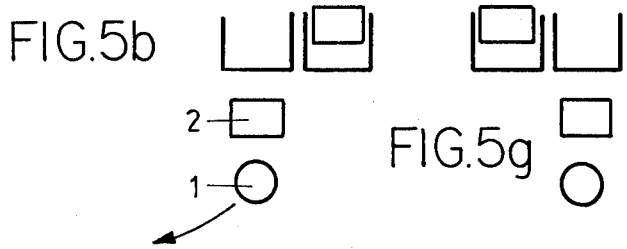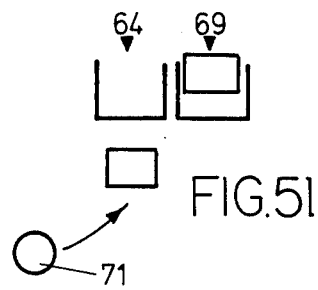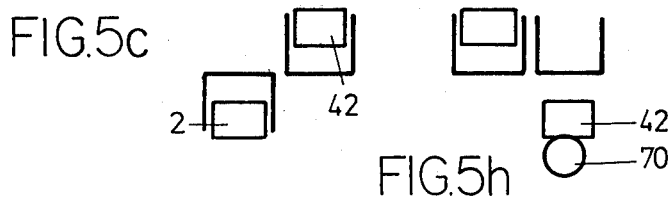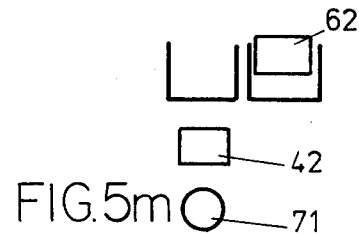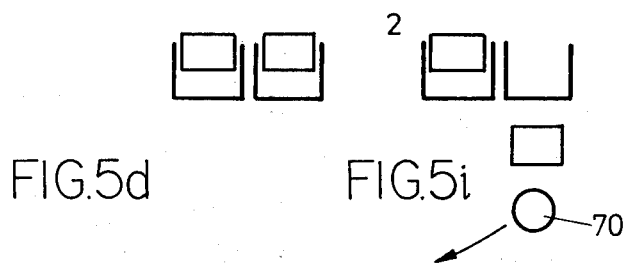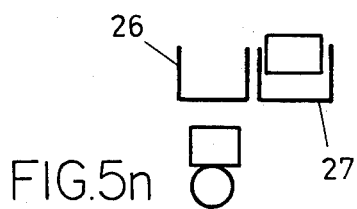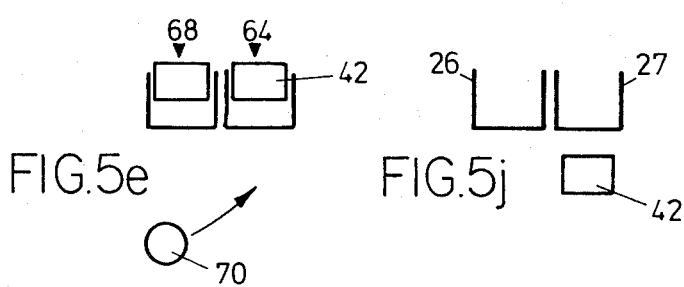

METHOD AND APPARATUS FOR EXCHANGING TOOLS IN HOBBING MACHINES

FIELD OF THE INVENTION

The invention relates to a method and an apparatus for the performance of the method of automatically exchanging the tool in hobbing machines, in particular those which are equipped with devices for effecting an automated sequence of operations for any desired or predetermined number of working cycles. Part of a working cycle is to include the feeding and chucking of the workpiece, the driving down of the arm brackets, supplying the workpiece carriage, the actual milling operation, the returning of the workpiece carriage, the return level of the milling carriage with a simultaneous shifting of the cutter, the driving up of the arm brackets, the release of the chuck for the workpiece and the removal of the toothed workpiece.

BACKGROUND OF THE INVENTION

The same types of workpieces are always worked with the same machine setting over long periods of time on hobbing machines. These machines are utilized in large-scale production. The workpieces are automatically supplied by loading devices and are removed again after being worked so that the operation of the machines, if they are adjusted for the working of a certain workpiece, is limited to the changing of worn tools (and possibly a change of the adjustment in relation to the new tool). Depending on the working conditions, a tool exchange is usually necessary after four to eight hours of use, thus after the cutting of teeth of a predeterminable number of workpieces. It is necessary to stop the machine during the time that the tool exchange is occurring, wherein the periods of disuse become still longer, if the adjuster is not there on time or cannot be there on time. In addition, a necessary cutter exchange is among others also disadvantageous, when the machine is to work beyond the normal working time, however, an adjuster is not available.

Starting out with these inadequacies, the basic purpose of the invention is to develop a method for the automatic exchange of the tool in hobbing machines and an apparatus for performing the method.

Devices for the automatic tool exchange in tool machines are know, for example in milling machines from German OS No. 25 25 364 or in turning machines from German OS No. 26 02 930. A transfer of these known tool-exchange systems onto hobbing machines is, however, not possible, because the insertion and chucking functions occur on both ends in the case of the hob, thus different conditions exist.

As a solution to the task, a method is first proposed, in which at least two gripping devices are provided, of which one removes the tool which must be exchanged, thus the work hob, from the working position of the machine and the other gripping device supplies a new tool, thus a new or reground hob, wherein the loading of the one gripping device and the unloading of the other is done by hand at any desired point in time.

This method can be performed differently for the space situations which exist on the machine. For example, it is possible to always perform both the loading and also the unloading operation outside of the machine, the one operation one time on the one side of the machine and the other operation on the opposite side. Other method steps, however, permit the unloading always on the same side of the machine and the loading always occurs at the same place above the working position, thus more in the center of the machine.

In all cases, the actual changing of the tool occurs automatically and the loading of the one gripping device with a new cutter or the unloading of the exchanged cutter in the other gripping device can take place at any desired point in time. In consideration of existing safety regulations, one will perform this operation, however, during inoperative times on the machine, preferably during the exchange of workpieces between two working cycles. For the inventive method for effecting the automated tool exchange, an apparatus is proposed in which the at least two gripping devices are movable along a shaft which is parallel with respect to the milling spindle and are pivotal about the axis of the shaft in the region of the cutter, which must be exchanged. A loading and unloading station exist on the path of movement.

Hobs often have shoulders which are cylindrical at both ends. Therefore, a gripping device is particularly suited for the apparatus according to the invention, which consists of two gripping means which are movably spaced from one another and are arranged on a common carrier, which gripping means grip and hold the respective cutter on the shoulders. However, it is also possible to use hobs, which are secured on a mandrel (for example according to German Gbm No. 76 16 406.2), wherein the pair of gripping means can then insert the tool unit on the mandrel which projects at both ends from the central opening of the cutter.

The gripping devices can be moved on a shaft or the like, which is rotatable through a certain angle, however, not movable axially, by a hydraulic cylinder. A hydraulic rotary piston or the like is provided for the rotary movement. In order that the gripping devices can also partake in the rotary movement, a carrier is provided on the shaft or the like.

A common longitudinal movement of the gripping devices and the swivellability of only one thereof is achieved by connecting the gripping devices to a coupling sleeve which permits the relative rotary movement and the nonswinging gripping devices are held by fixed guide bars or the like. The gripping device which is to be swivelled engages the carrier already prior to reaching and swivelling or exchange position, thus as long as it is still held by the guide bars.

It is of a particular advantage for the automated changing of the tool, if the devices which are needed for holding, guiding and moving of the gripping devices are arranged on the tool carrier, because then the new tools are always positioned parallel with respect to the milling spindle also in the case of an inclined position of the tool carrier, as it is necessary for cutting of helical workpieces.

It is furthermore preferable for the automated changing of the tool if the machine to which the inventive method is applied has devices for digital or other data input. The cutters which are used one after the other do not have the same dimensions, in particular diameters. Since in the case of the automated tool exchange, a suitable manual changing of the machine adjustment is not possible, it is then possible to feed in and store the aforemeasured values in order to automatically achieve after the cutter exchange a correspondingly corrected workpiece feed.

The machine control becomes simpler, if the automated tool exchange always takes place automatically from the respective shift position of the cutter at the same point on the shift path.

Various constructions are possible for the gripping means: They can be closed and opened hydraulically or, however, can be held in closed position by spring force and can be opened hydraulically against the spring force. The latter solution enhances operating safety.

It is preferable to construct the gripping means so that the cutter projects with a carrier cam into a corresponding recess in the gripping means, which is arranged such that the cutter is fed correctly aligned to the chuck, namely that the carrier cam projects into a corresponding recess in the milling spindle.

Compared with the known and generally common procedures for exchanging the tool in hobbing machines by hand, the method for the automated tool exchange according to the invention achieves a whole series of advantages not readily apparent from the illustrated sequence:

1. Longer running times for the machine until a manual procedure is necessary; the point in time of the manual procedure can be selected freely within wide limits;
2. Different cutter diameters can be determined outside of the machine and can be considered on the machine side;
3. The exchange of the cutter unit in a magazine requires less time by an expert on the machine;
4. The danger of injury to the operating personnel is less, the exchange requires less effort;
5. The danger of a tool damage during the tool exchange is almost impossible.

BRIEF DESCRIPTION OF THE DRAWINGS

The invention will be described hereinbelow with reference to one exemplary embodiment, which is illustrated in FIGS. 1 to 5, in which:

FIG. 3 is a cross-sectional view taken approximately along the line III—III in FIG. 2;

FIG. 4 schematically illustrates the sequence of the method in several phases;

FIG. 5 also schematically illustrates a different sequence of the method in several phases.

DETAILED DESCRIPTION

Figure 1:
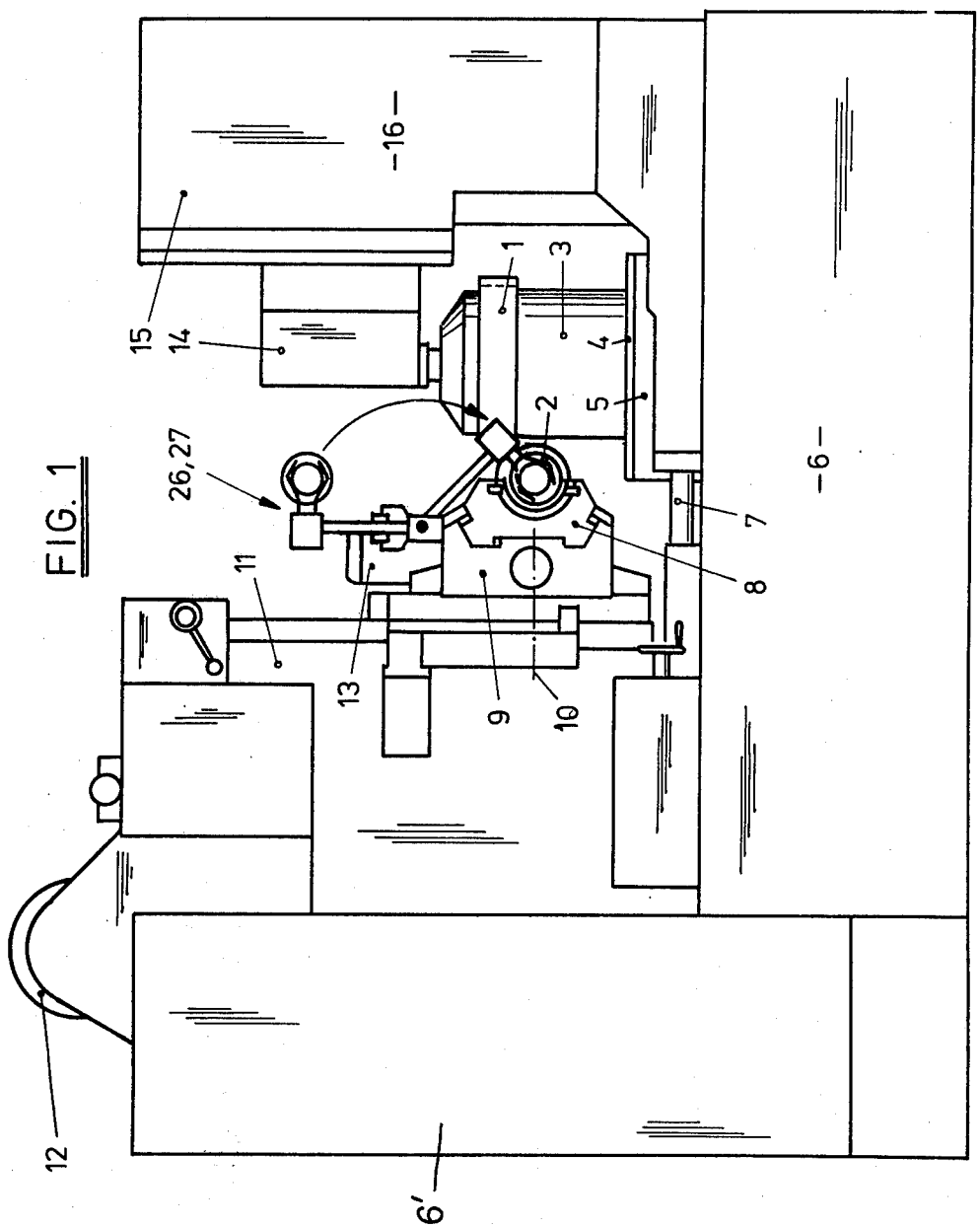
FIG. 1 illustrates a hobbing machine, on which the method and the apparatus according to the invention can be applied.

FIG. 1 illustrates a gear hobbing machine having an apparatus for exchanging the cutter according to the invention. The workpiece 1, a spur gear, which is being worked on by a hob 2, is clamped with the aid of a chuck 3 on the faceplate 4 of a workpiece spindle 5. The workpiece spindle is rotatably supported on a workpiece carriage 16 which is movable in the machine frame 6. The workpiece carriage 16 is driven by a motor through a gearing and through a transmission shaft and a worm gear. These elements are known and, since they are of no importance for the invention, are not shown with the exception of the transmission shaft which is identified by the reference numeral 7.

The hob 2 is rotatably supported in a shift carriage 8. The associated milling head 9 is pivotally supported for movement about the axis 10 (FIGS. 1 and 2) on the milling carriage 11 namely so that the hob can be adjusted to the desired lead angle and the helix angle of the teeth on the workpiece. With the aid of the milling carriage 11, it is possible to move the hob parallel with respect to the axis of the workpiece spindle (in machines having differential gearing) or parallel with respect to the workpiece teeth (in machines which operate according to the so-called Grant-method). The guide for the milling carriage 11 is provided on an upwardly projecting part 6' of the machine frame. The workpiece 1 or its chuck or a mandrel can be supported by means of a tailstock 14. The tailstock is supported for longitudinal movement and, therefore, is drivable and clampable on an overarm support 15 which is secured to a workpiece carriage 16 or forms one unit with same. To chuck the workpiece on the faceplate or workpiece spindle, a drivable chucking device is provided. The diameter and the tooth depth of the workpiece can be selected and adjusted with the workpiece carriage 16. The presence of the workpiece carriage 16 is no prerequisite for the application of the inventive method or for the use of the apparatus. The method and apparatus can also be used in machines wherein the workpiece spindle and the workpiece chucking devices are not movable transversely with respect to the workpiece spindle 5 on the machine frame 6 and, instead, the milling head 9 is, in addition, movable transversely with respect to the workpiece spindle. Vertical feed, longitudinal feed, rotation of the hob and rotation of the workpiece are driven from a drive motor 12 through a gearing which is principally known. To shift the hob, a further electric motor, a so-called shift motor 13, is provided, which acts through a gearing (not shown) and a screw (also not shown) onto the shift carriage.

Figure 2:
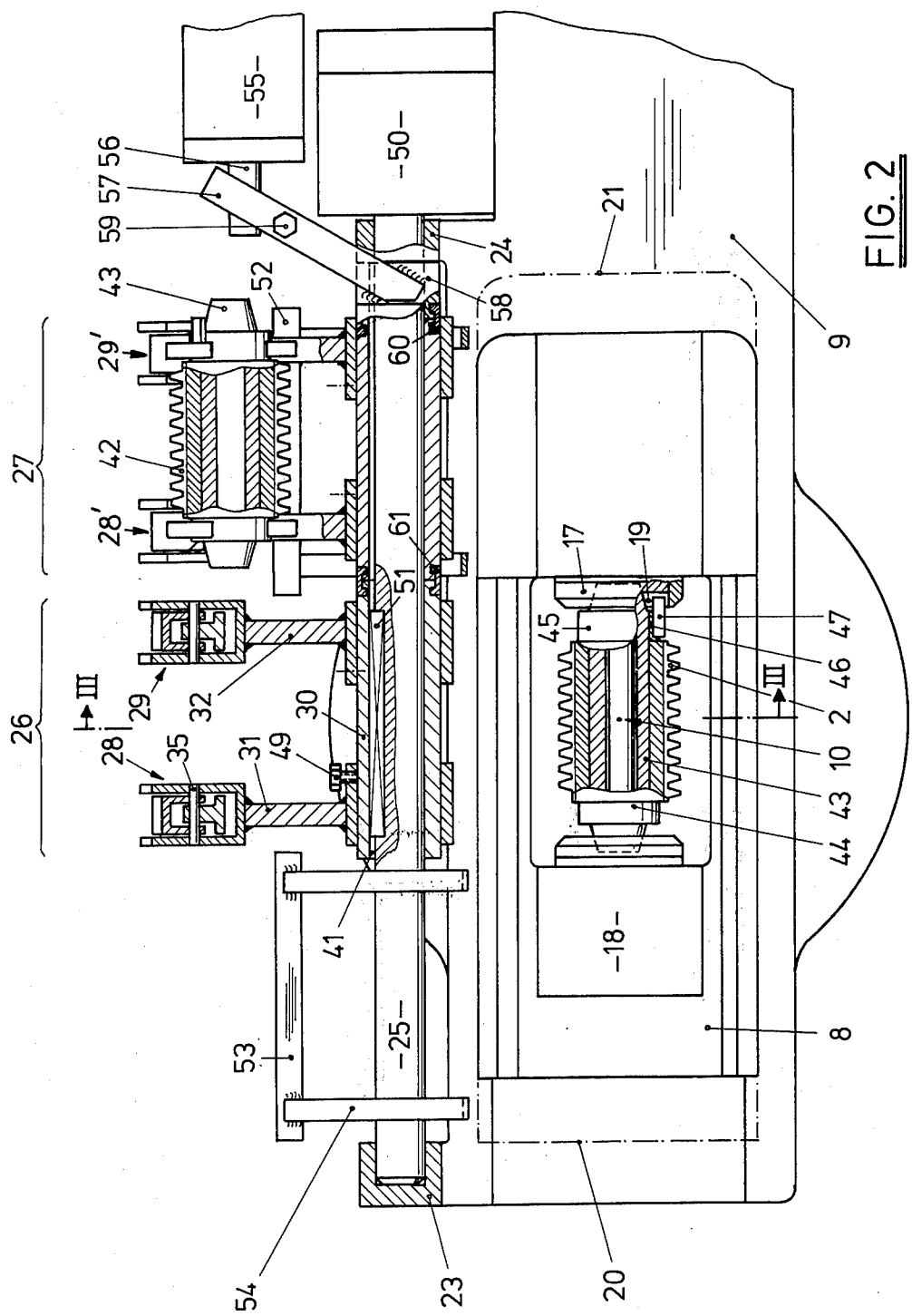
FIG. 2 is a longitudinal cross-sectional view of the inventive apparatus.

The apparatus for the automated tool exchange is assembled on the milling head 9 (FIGS. 2 and 3). A shaft 25 is rotatably supported in two bearing blocks 23 and 24, angularly positioned at a certain angle α, however, is not longitudinally movable and extends parallel with respect to the axis of the milling spindle 17. Two gripping devices 26, 27 are arranged longitudinally movable on the shaft 25 so that the rotary movement of the shaft is not hindered.

Each gripping device consists substantially of two gripping means 28, 29, each having a hub 30, 30', respectively, thereon which are longitudinally movable relative to the shaft 25 and are selectively positionable along the length of the shaft and are selectively fixed to the shaft to rotate therewith (the parts of the first gripping device 28 are identified hereinbelow with the usual reference numbers and the corresponding parts of the second gripping device 29 are identified by the same numbers but with a prime (') suffix added thereto. A first jaw piece 33 and a second jaw piece 34 are mounted movably relative to one another on an axle 35 which is mounted in a carrier 31, 32. A spring 36 assures that the two jaw pieces 33, 34 are urged toward one another for gripping purposes. A hydraulic cylinder 37 is provided for effecting an opening of the gripping means formed by the two jaw pieces, which hydraulic cylinder 37 is supplied with pressure oil through conventional and, therefore, not illustrated devices. If the cylinder chamber 38 is pressurized, the piston 39 urges the two jaw pieces apart and thus opens the gripping means. The described structure of the gripping means, which is illustrated very schematically in the drawings, is not limited to this design. It is also possible to use all other types of gripping means, for example those which are operated hydraulically or pneumatically for opening and closing purposes, which are suited for the invention due to their type of construction.

The jaw pieces 33, 34 are each constructed such that they can receive a hob 2, 42 on laterally spaced cylindrical shoulders or on cylindrical shoulders 44, 45 of a mandrel 43. Such mandrels are known and do not need to be described more in detail here. At least one of the two shoulders can be formed by a chucking element, for examply hydraulic nut 46.

It has already been mentioned that the gripping means 28, 29 are longitudinally movable and selectively fixably positionable on the hub 30. Thus the lateral spacing therebetween can be adjusted corresponding with the length of the cutter or the mandrel and in the position relative to the cutter 2 which must be exchanged. Fastening can be accomplished in the simplest manner by a setscrew 49, however, it is also possible to use all other conventional means, such as conical locking rings, etc.

OPERATION

The apparatus operates as follows. Approximately above the hob 2, which is in use, there is positioned the first gripping device 26 with the empty gripping means 28, 29. Next to it is positioned the second gripping device 27, the gripping means 28', 29' which hold a new or rather reground hob 42. If the cutter 2 is now to be exchanged at a predetermined point in time, the cutter and the workpiece 1 are first disengaged by enlarging the axial distance therebetween, namely by moving the workpiece carriage 16. The gripping device 26 is then swung toward the cutter 2. For this purpose—as mentioned above—the shaft 25 is rotatable through the corresponding angle α, a rotary piston 50 or a different suitable drive mechanism, for example a hydromotor, after which a gearing is possibly yet connected, is used as a drive. The gripping device 26 is carried along with the aid of a key 51 or the like which effects a connection of the shaft 25 to the hub 30 to facilitate a rotation therewith. The two gripping means 28, 29 are opened, grip over the cylindrical shoulders 44, 45 of the mandrel 43 or of the cutter and are closed again. As soon as the clamping force holding the cutter between the milling spindle 17 and the outer support bearing 18 is released, the gripping device 26 is again swung upwardly and takes therewith the cutter 2 out of the working position.

The length of the key 51 is limited at a maximum to a section of the shaft 25, on which is provided the first gripping device. In order to prevent the second gripping device 27 from rotating along due to frictional forces or from tipping away due to overweight which is for example caused by the cutter 42, lateral support rails 52 are provided, which are secured on the milling head through suitable holders 54. In order to effect a movement of the new cutter 42 into the working position thereof, both gripping devices are longitudinally moved on the shaft 25. For this purpose, a double-acting hydraulic cylinder 55 is provided, the piston rod 56 of which is connected to and acts through an intermediate piece 57 onto a sliding ring 58 connected to the intermediate piece. The intermediate piece is slotted for facilitating a securement to the piston rod and the laterally spaced legs are clamped thereto by a screw 59. Of course, any other kind of rigid connection is also possible. Thus the two gripping devices 26, 27 are moved by the hydraulic cylinder 55 (in FIG. 2 to the left). The first gripping device 26 is thereby guided between a pair of support rails 53, before the hub 30 with its groove 41 is released from the key 51. On the other side, the pair of support rails 52 are sufficiently long that the hub 30' of the second gripping device with its groove 41 receives the key 51 therein, before it leaves the area of the support rails 52. After reaching the end position, the second gripping device 27 is swung downwardly with the new cutter 42 by rotating the shaft 25 so that the cutter is received between the milling spindle 17 and the outer support bearing 18 whereafter the new cutter 42 is clamped in position and is followed by an opening of the two gripping means 28', 29'. The gripping device is then again swung upwardly empty. In order to be able to feed a cutter to the milling spindle 17 in such a manner that a cam 47 is positioned correctly with respect to a corresponding recess 19 in the milling spindle, control devices (which are not shown) assure that the milling spindle is always stopped in a certain position. Furthermore a corresponding recess 40 for receiving the cam therein is provided in the gripping means 29, 29', (see the recess 40 in the connecting piece 33 in FIG. 3), which—when the gripping device is swung downwardly—coincides with the recess 19 in the milling spindle 17.

While the cutter 42 is in use, the exchanged cutter 2 can be removed and a different new cutter 62 can be fed to one of the two gripping devices 26, 27. This will be discussed further hereinbelow. When the gripping devices are to be pulled back again, the other cylinder chamber of the hydraulic cylinder 55 is pressurized. In order that the sliding ring 58 effects a movement of the gripping devices (in FIG. 2) to the right, the second gripping device 27 is connected to the sliding ring through a coupling sleeve 60 and the two gripping devices 26, 27 are connected together through a coupling sleeve 61.

The operating sequence of the automated cutter exchange is possible in various ways. One possibility is illustrated in FIG. 4, namely only the two gripping devices, the cutters and the workpiece are illustrated in their respective positions.

a. The first gripping device 26 is positioned above the cutter 2, which works the last workpiece 1 prior to the cutter exchange, in the so-called swivelling or exchange position 64; the second gripping device 27 is in the ready position in the loading station 65 with a new cutter 42.

b. The finished milled workpiece 1 is moved away from the cutter 2 and is taken out of the machine (for example through an automatic feeding device).

c. The first gripping device 26 is swung downwardly and receives cutter 2.

d. The gripping device 26 is again swung upwardly.

e. Both gripping devices 26, 27 are moved to the left, so that the first gripping device 26 is in the removing station 66 and the second gripping device is in the swivelling or exchange position 64. A new workpiece 70 is supplied.

f. The second gripping device 27 is swung downwardly, the new cutter 42 is received by the chucking device which is not illustrated here.

g. The gripping device 27 is again swung upwardly, the workpiece 70 is moved toward the cutter 42.

h. The new workpiece 70 is worked in the conventional manner.

i. The finish-worked workpiece 70 is removed. The following phases can follow now or after the working of several other workpieces.

j. The exchanged cutter 2 is removed from the first gripping device 26.

k. A new cutter 62 is inserted into the first gripping device 26 and is received by same.

l. A new workpiece 71 is supplied.

m. The workpiece 71 is moved toward the cutter 42.

n. The workpiece 71 is worked in a conventional manner.

The further sequence takes place as has been described starting with position b, only now loading station 65 and removing station 66 are exchanged.

A different possibility of the cutter exchange is illustrated in FIG. 5.

a. The first gripping device 26 is positioned above the cutter 2, which works the last workpiece 1 prior to the cutter exchange, in the so-called swivel or exchange position 64; the second gripping device 27 is in a waiting position 69 in the ready condition with a new cutter 42 therein.

b. to j., as described above with reference to FIG. 4.

k. A new cutter 62 is inserted into the second gripping device 27 and is received by same.

l. Both gripping devices 26, 27 are moved to the right, so that the first gripping device 26 is again in the swivel or exchange position 64 and the second gripping device 27 with the new cutter 62 is in the waiting position 69. A new workpiece 71 is supplied.

m. The workpiece 71 is moved toward the cutter 42.

n. The workpiece 71 is worked in a conventional manner.

The further sequence takes place as has been described above starting with position b.

Not considered in FIGS. 4 and 5 is the axial shifting of the cutter between each two working cycles, in order to be able to utilize the entire cutter length. For this purpose the elements which drivingly clamp the cutter 2, such as the milling spindle 17 and outer support bearing 18 are arranged on a shift carriage 8, the end positions 20, 21 of which are indicated by dash-dotted lines in FIG. 2. For an orderly exchange of the cutter 2 it is necessary, to move the shift carriage 8 for this always into the same position. The control for adjusting the shift carriage must be designed correspondingly for this, so that the shift carriage can move toward this position prior to the cutter exchange, for example the center position as illustrated in FIG. 2. Of course, the cutter exchange can take place also in any other position of the shift carriage, when the device for the cutter exchange and the control of the shift carriage are suitably adjusted relative to one another.

The invention is described above with reference to one exemplary embodiment having two gripping devices. Obviously this is also valid for devices for an automated tool exchange in hobbing machines having more gripping devices, so that at the start of the operation several new cutters are already waiting and which are to be used one after the other. As a result, the time of use of the machine without attention can still be further extended.

Figure 6:
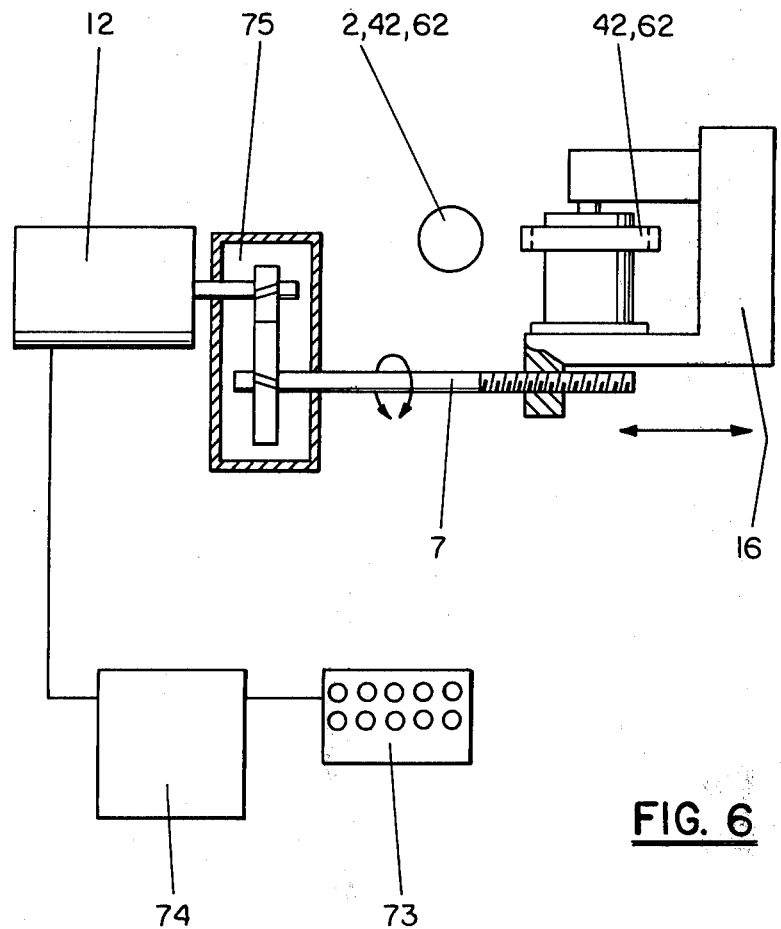
FIG. 6 is a schematic circuit diagram for facilitating an adjustment of the carriage 16 to compensate for different dimensions occurring between new and used tools.

The cutters which are being used one after the other do not have as a rule the same dimensions, in particular diameters. Since in the automatic tool exchange process a manual change of the machine adjustment is not possible, with which the different cutter dimensions can be balanced out, devices for a digital or other data input must be provided on the machine. The new cutters 42, 62 which are inserted into the gripping means 26, 27 are measured beforehand. This measurement takes place outside of the machine. The determined values, namely in particular the diameters, are fed with the devices 73 (FIG. 6) into the machine control 74, where they are stored, in order to automatically achieve after the cutter exchange a correspondingly corrected workpiece supply. The motor 12 adjustably drives through the gearing 75, which is only schematically illustrated by the gear pair, the spindle 7 and the workpiece carriage 16 is therewith adjustably moved toward or away from the tool, in order to balance out the difference of the new cutter 42, 62 with respect to the exchanged cutter 2, 42.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method for the automated tool exchange in hobbing machines having means facilitating an automatic sequence of operation for any desired number of workpieces, comprising the steps of moving only a first of said gripping devices at one point on the path of movement along the shaft into the region of a cutter which must be exchanged, a second of said gripping devices remaining stationary during the aforesaid movement of said first gripping device, gripping the cutter which must be exchanged with said first gripping device and removing the cutter from the cutting position, adding a new cutter at a loading point to said second one of said gripping devices which grips same therein, moving said first and second gripping devices together along the length of said shaft and thereafter moving only said second gripping device with said new cutter therein to said cutting position whereat said new cutter is released by said second gripping device, said first gripping device simultaneously carrying said cutter which must be exchanged to a location for removal thereof from said first gripping device, clamping said new cutter into said cutting position, and releasing the grip between said new cutter and said second gripping device to enable said new cutter to perform a certain number of working cycles.

2. The method for the automated tool exchange in hobbing machines according to claim 1, including the following method steps:

a. positioning said first gripping device away from said cutter which must be exchanged, while said new cutter is in said second gripping device in a first removing-loading station;

b. removing said cutter which must be exchanged from engagement with said workpiece;

c. moving the empty first gripping device toward said cutter which must be exchanged and receiving said cutter therein;

d. releasing the clamping engagement of said cutter from said machine and moving said cutter with said first gripping device out of the working position;

e. moving said cutter which must be exchanged with said first gripping device to a second removing-loading station; at the same time moving said new cutter with said second gripping device to said one point;

f. moving said new cutter into said working position and clamping said new cutter in said working position;

g. moving the now empty second gripping device to a position where it remains during the working cycles which are to be carried out by said new cutter;

h. removing said cutter which is to be exchanged at said second removing-loading station at any desired point in time during the working cycles now taking place and adding a new, namely a third, cutter, preferably during a workpiece exchange, namely between working cycles;

i. after a certain number of working cycles have taken place, repeating the process of the tool exchange by reversing at least one of the terms (1) "first" and "second" removing-loading station and (2) "first" and "second" gripping device.

3. The method for the automated tool exchange in hobbing machines according to claim 1, including the following method steps:

a. positioning said first gripping device substantially away from said cutter which must be exchanged, while said new cutter is in said second gripping device in a waiting position;

b. removing said cutter which must be exchanged from engagement with said workpiece;

c. moving the empty first gripping device toward said cutter which must be exchanged and receiving said cutter therein;

d. releasing the clamping engagement of said cutter from said machine and moving said cutter with said first gripping device out of the working position;

e. moving said cutter which must be exchanged with said first gripping device to a removing station; said new cutter being at the same time moved with said second gripping device from said waiting position to said one point;

f. moving said new cutter into said working position and clamping said new cutter in said working position;

g. moving the now empty second gripping device to a position where it remains during the working cycles which are to be performed by said new cutter;

h. removing said cutter which is to be exchanged at said removing station at any desired point in time during the working cycles which are now taking place; furthermore said second gripping device which is located at said one point and which at the same time is the loading station is loaded with a new, namely a third cutter, preferably during a workpiece exchange, namely between two working cycles;

i. moving said second gripping device with said third new cutter into said waiting position and the now empty first gripping device to said one point, both gripping devices remaining so during the working cycles which must be carried out by the cutter;

j. after a certain number of working cycles have taken place, repeating the process of the tool exchange.

4. An apparatus for the automated tool exchange in hobbing machines having a milling spindle and means facilitating an automatic sequence of operation for any desired number of workpieces, comprising at least two similar gripping devices axially spaced along a shaft which extends parallel with respect to said milling spindle and are each separately pivotal about the axis of said shaft at one point of the path of movement of said gripping devices in the region of the cutter which must be exchanged, a first of said two gripping devices including means for removing said cutter which must be exchanged and said second of said two gripping devices including means for supplying a new cutter, and wherein a loading and removing station is provided on the path of movement for facilitating an exchange of a used cutter for a new cutter.

5. The apparatus according to claim 4, wherein each gripping device consists of two correlated gripping means spaced axially along said shaft from one another shaft and have laterally spaced shoulders thereon for supporting said cutter.

6. The apparatus according to claim 4, wherein said shaft is axially fixed, wherein said gripping devices are movable along the length of said shaft and drive means are provided for driving said gripping devices along the length of said shaft.

7. The apparatus according to claim 6, wherein said shaft is rotatable, and wherein further drive means are provided for rotatably driving said shaft through an angle of traverse ($\alpha$) and means for selectively coupling one of said gripping devices to said shaft for rotation therewith in response to the location of said one gripping device along the length of said shaft.

8. The apparatus according to claim 7, wherein said two gripping devices are each connected to said shaft through a coupling sleeve which facilitates the rotating movement of each gripping device with respect to the other and said shaft which supports the gripping device which is not in a position in said region of said cutter includes holding means for preventing a rotation thereof when said shaft is rotated.

9. The apparatus according to claim 7, wherein said selective coupling means includes a key fixed to said shaft and wherein a gripping device in said region of said cutter has a recess therein which receives said key prior to said gripping device exiting from the area of said holding means during its movement along the length of said shaft.

10. The apparatus according to claim 4, wherein said shaft, said drive means and said holding means are arranged on a milling head of said hobbing machine and are pivotal with same about an axis which is directed transversely with respect to said milling spindle.

11. The method according to claims 1, 2 or 3, wherein prior to insertion of said new cutter into a gripping device its dimensions, in particular diameter are measured and thereafter the spacing between the cutter axis and the workpiece axis are adjusted to accommodate said new cutter in said machine.

12. The method according to claim 1, wherein a cutter exchange occurs independently of the path of movement of said cutter along the length of said shaft but always at the same point on said path.

13. The apparatus according to claim 5, wherein said gripping devices each include a spring means for holding a cutter therein and further means for effecting a release of said cutter against the force of said spring means.

14. The apparatus according to claim 4 or claim 5, wherein said cutter includes a shoulder thereon and wherein each gripping device has at least one recess, into which projects said shoulder, and wherein said recess is arranged on each of said gripping devices so that said cutter is fed position-true to similar recesses on said milling spindle.

* * * * *